(12) United States Patent
Chiou et al.

(10) Patent No.: US 6,171,179 B1
(45) Date of Patent: Jan. 9, 2001

(54) BALL GRINDING MACHINE

(75) Inventors: Yuang-Cherng Chiou; Rong-Tsong Lee, both of Kaohsiung (TW)

(73) Assignee: National Science Council, Taipei (TW)

( * ) Notice: Under 35 U.S.C. 154(b), the term of this patent shall be extended for 0 days.

(21) Appl. No.: 09/490,560

(22) Filed: Jan. 25, 2000

(30) Foreign Application Priority Data

Jan. 13, 2000 (TW) .............................................. 089200575

(51) Int. Cl.$^7$ ....................................................... B24B 7/00
(52) U.S. Cl. .............................. 451/262; 451/50; 451/488
(58) Field of Search .............................. 451/262, 50, 282, 451/283, 286, 284, 488, 548, 450, 449

(56) References Cited

U.S. PATENT DOCUMENTS

| | | | |
|---|---|---|---|
| 3,924,356 | * 12/1975 | Kitchel | 451/50 |
| 3,984,945 | * 10/1976 | Messerschmidt | 451/50 |
| 4,965,967 | * 10/1990 | London | 451/50 |
| 5,214,884 | * 6/1993 | Kinoshita et al. | 451/50 |
| 5,520,573 | * 5/1996 | Sumita et al. | 451/50 |
| 5,906,535 | * 5/1999 | Tonooka et al. | 451/50 |

* cited by examiner

*Primary Examiner*—Derris H. Banks
(74) *Attorney, Agent, or Firm*—Fish & Richardson P.C.

(57) ABSTRACT

A ball grinding machine for grinding ceramic bearing balls and the method thereto employing a non-rotating upper circular plate and a rotating lower circular plate to perform precision grinding of ceramic balls. The grinding mechanism according to the present invention comprises two or more separate concentric fixed rings, adjacent annular recesses into the lower surface of the upper circular plate, and corresponding two or more concentric hydraulic pressure rings inserted into said recesses, each with a slanted bottom surface towards the adjacent fixed ring for supplying pressure to the ceramic bearing balls on top of the lower circular plate at a sloped angle. The inner surface of the fixed ring, the slanted bottom surface of the pressure ring, and the grinding surface of a diamond grinding wheel installed on top of the rotating lower circular plate together form a grinding track. Different hydraulic pressures through hydraulic lines to the pressure rings give different grinding loads to the surface of the ceramic bearing balls in the grinding track, whereas the diamond grinding wheel on top of the lower circular plate grinds the ceramic balls at high speed. Different sizes or types of pressure rings, fixed rings, and diamond grinding wheel can be switched according to the different requirements of a rough grinding process, a fine grinding process, or a lapping process.

13 Claims, 13 Drawing Sheets

BALL GRINDING MACHINE

BACKGROUND OF THE INVENTION

1. Field of the Invention

The present invention relates to a ball grinding machine. More specifically, the invention relates to a ball grinding machine for machining and manufacturing ceramic bearing balls, which employs a non-rotating upper plate and a rotating lower plate for grinding ceramic balls in between and for achieving improved ball sphericity, surface roughness, and uniformity.

2. Description of Related Art

Precision ceramic bearing balls are considered indispensable mechanical parts today and will play an even more important role in the foreseeable future, especially in fields where they are not easily replaceable by conventional steel bearing balls, for example aerospace and precision mechanics. Precision ceramic bearing balls possess such advantages as being able to function under high operating temperatures and speed without apparent wear and tear, and they can also function reasonably well under extremely corrosive environment. The characteristics of precision ceramic bearing balls make them a key component in the fabrication of high-speed precision bearing tools. However, since a typical ceramic workpiece has a very hard and brittle surface, it can not be as easily and efficiently machined by a conventional ball grinding or lapping machine as a typical steel workpiece. The ball grinding machine according to the present invention, therefore, solves the above-mentioned problems by providing a simple but practical mechanism for easy maintenance, high production rate, and uniform machining quality.

The machining steps for mass-producing ceramic bearing balls typically involves putting ceramic material of crude spherical shape into different ceramic ball grinding machines after they are sorted or graded by the degree of sphericity and surface roughness. Thus, a rough ceramic ball can proceed from a rough grinding machine to finer grinding machines then finally to a lapping machine for forming precision ceramic bearing balls. The difference between the production steps of a steel bearing ball and a ceramic bearing ball lies in the preparation of the steel and ceramic materials in their crude shapes. The crude material for the production of steel bearing balls is typically prepared by shearing a steel rod into cylindrical blanks then shaping each cylindrical blank into a crude spherical shape by a pressing machine fitted with a pressing mold. On the other hand, the raw material for the production of ceramic bearing balls typically starts with pressurizing a predetermined amount of ceramic powder with a pressing mold into a spherical shape and followed by a sintering step for forming a rough ceramic ball. There are different pressing methods available for pressurizing the ceramic powder into a rough ceramic ball, including mechanical pressing, cold isostatic pressing, and hot isostatic pressing.

Furthermore, each bearing ball is graded by degree of sphericity and surface roughness, wherein the most important factor contributing to the grade of a bearing ball is the design of the ball grinding mechanism, which includes such variables as grinding rate, grinding load, and material compositions of the bearing ball, grinding wheel, and slurry. In general, the ball grinding mechanism directly affects the patterns of grinding movements, the damping effect, and thus the result of a grinding finish. Up to the present, the most commonly applied ball grinding mechanism or method for grinding a steel bearing ball is the grinding wheel method, which provides satisfying ball sphericity and surface roughness. Whether the grinding finish of a steel bearing ball is to be fine or rough is basically determined by the size and the roughness of the abrasive grains of the grinding wheel. Traditional grinding wheel method performs steel bearing ball grinding by batch loads, but since the rotation rate of the grinding wheel is typically below 100 rpm, it therefore has a low production rate. Also due to the fact that the grinding load or the pressure exerted by the one-piece grinding wheel towards each of the steel bearing balls is the same, it is difficult to quickly adjust the grinding load or pressure by the requirement of each batch load.

In recent years, emphasis has been placed on how to actively adjust the grinding rate and the grinding load to raise the production rate and grinding quality of the bearing balls, whereas the grinding load is the pressure exerted by the grinding wheel to a steel ball through three contacting surfaces. Grinding methods with such feature mainly include the magnetic fluid grinding method, the controlled rotating shaft grinding method, the planetary gear type grinding method, and the magnetic levitation grinding method, etc. However, most of the prior ball grinding methods incorporates a single grinding track design, so production by batch loads can not be carried out conveniently.

Furthermore, the grinding mechanism of a ball grinding machine dictates the limit of grinding quality by which a bearing ball can be machined. That is, the speed variation of a bearing ball spinning and orbiting in the grinding track depends on the revolving speeds of the bearing ball relative to the above-mentioned three contacting surfaces. In addition, the speed variation can be further attributed to the friction coefficients inherent to the bearing ball and the three contacting surfaces. By manipulating the combined speed and directional variations of the bearing ball spinning and orbiting in the grinding track, the surface of the bearing ball can be evenly and uniformly ground.

In 1976, after trying fourteen fundamentally different ball grinding machines on the same type of bearing balls, it was determined by Inagaki and Abe, that the grinding wheel method is the most effective grinding method to achieve the best ball sphericity and surface roughness, and is also by far the most productive method. FIG. 1 shows an example of such grinding wheel type ball grinding mechanism.

The ball grinding mechanism shown in FIG. 1 is comprised of a rotating grinding wheel 1 (the lower plate) and a fixed circular guiding plate 2 (the upper plate) disposed such that both of their working surfaces are positioned in parallel to each other with just enough separation in between for steel bearing balls 3 to be ground beneath the fixed circular guiding plate 2 and by the grinding surface of the concentric V-type annular grooves (not shown) of the lower plate. The two opposite surfaces in the V-type annular groove and the bottom surface of the upper plate together constitute the three contacting surfaces between each of the steel bearing balls 3 and the grinding mechanism. As the lower grinding wheel 1 rotates, the steel bearing balls 3 can be ground or machined accordingly. If the production of the steel bearing balls 3 is to be performed in batch mode, where thousands of steel bearing balls 3 are to be ground at a time, a fan-shaped guiding chute 4 is formed on the edge of the lower plate towards the direction of the center point in order to grind the steel bearing balls 3 in a continuous fashion. Efforts have also been made to improve the continuous feeding mechanism for the bearing balls such that the upper and lower circular plates of a grinding mechanism and drive shaft are all positioned at an inclined angle as disclosed in Taiwanese Patent No. 272156, 1996. Another design that features this improved continuous feeding mechanism has a horizontal positioning of the plates, such as the one disclosed in U.S. Pat. No. 5,301,470, April 1994, by Sato. On the other hand, in order to improve the feeding mechanism for the grinding fluid, or slurry, a plurality of slurry-supplying passages are formed in a fixed, non-rotating plate (not shown), such as the mechanism disclosed in Japanese Patent No. 7-314325, 1995.

Later in 1988, Umehara and Kato published a paper on the subject of magnetic fluid grinding method for machining precision ceramic balls 10. U.S. Pat. No. 4,821,466 was later issued to Kato et al. in April 1989 based on the same apparatus and method. Umehara et al., on the other hand, acquired a Japanese patent, NO. 8-257897, in October 1996 on a related mechanism design. As shown in FIG. 2, such method uses a slurry having abrasive grains suspended in a magnetic fluid as the grinding agent, referred to as magnetic grinding fluid 5 hereafter, wherein a non-magnetic material is formed into a lower floating plate, or a float 6, and positioned within the restriction of a guide ring 7 filled with the magnetic grinding fluid 5. In addition, a levitation force generated magnet sets 8 was adopted to act as the grinding load, and a cylindrical rotating shaft 9 with a chamfered end performs the function of an upper plate in driving the precision ceramic balls 10 into high-speed rotation. The aforementioned grinding method proclaims the advantages of high machining rate and fine ball sphericity and surface roughness.

A magnetic fluid with grinding wheel method was disclosed by Chang and Nakajima in 1997, utilizing the grinding mechanism as depicted by FIG. 3. This mechanism improves the prior magnetic fluid grinding mechanism by adding an upper diamond grinding wheel 11 onto the rotating shaft 9 of FIG. 2 and by adding a gum diaphragm 12 in a lower position and a taper thrust 13 on top of a non-magnetic float 6. A magnetic fluid 14 is filled below the gum diaphragm 12 and above a combination of magnet sets 8 to exert a grinding load, and a grinding fluid 15, is filled above the gum diaphragm 12 to assist grinding by providing abrasive grains in suspension. Furthermore, FIG. 4 shows that compression springs 16 are used in place of the magnet sets 8 shown in FIG. 2, in a non-magnetic fluid grinding method disclosed by Chang and Childs.

In 1990, a controlled rotating shaft grinding method for manufacturing precision ceramic bearing balls was disclosed by Kurobe et al. Referring to FIG. 5, the method includes controlling and varying the inclination angle of the spin axis of each ceramic bearing ball, wherein the inclination angle is the angle of spin axis with respect to a horizontal plane. As shown in FIG. 5, a grinding mechanism according to such method comprises a first motor 17, a second motor 18 and a rotary joint 19 controlling the rotating speeds of an upper lapping plate 21, a lower inner lapping plate 22, and a lower outer lapping plate 23, each independently driven through a synchronous belt 20 mechanism. Moreover, tiny abrasive diamond grains are suspended in a water-based fluid as a slurry, and an grinding load exerted upon each of the ceramic bearing balls is actuated through compressed air. In 1991, Ichikawa et al. disclosed a precision lapping machine for ceramic balls as shown in FIG. 6. This particular precision lapping machine resembles a conventional lapping machine, wherein the center of an upper rotating plate 24 of smaller diameter is offset to the center of a lower rotating plate 25 of larger diameter. Furthermore, a first lapping tool 26 and a second lapping tool 27 carrying a first grinding load 28 and a second grinding load 29, respectively, are incorporated into the upper rotating plate 24 for the lapping of precision ceramic balls. A similar design is disclosed by a Japanese Patent No. 7-77705.

Also as shown in FIG. 7, The Institute for Manufacturing Technologies of Toshiba Japan disclosed a magnetic levitation grinding mechanism, wherein the rotation speeds with respect to each of the three contacting surfaces of a bearing ball are controlled and adjusted by three separate motors, which resembles the controlled rotating shaft grinding method depicted by FIG. 5. This particular grinding method is characterized by its use of magnetic levitation force as the grinding load.

SUMMARY OF THE INVENTION

Accordingly, the object of the present invention is to provide a precision ball grinding machine that is capable of overcoming the drawbacks and disadvantages of the prior art. In particular, the ball grinding machine according to the present invention is comprised of simple mechanisms for easy maintenance and replacement of parts, while also achieving high machining rate, uniform finishing quality, and mass-production objectives. The grinding mechanism according to the present invention can achieve a higher degree of finishing quality than the prior arts by actively adjusting each of the friction lo coefficients and rotation speeds with respect to the three contacting surfaces of a bearing ball.

The ball grinding machine for grinding precision ceramic bearing balls according to the present invention comprises a non-rotating upper plate, at least a concentric floating ring and an adjacent fixed ring, a body frame, a driving shaft, a rotating lower plate, a vertical dovetail slide, a ball joint, and a hydraulic device.

Furthermore, at least a concentric hydraulic chamber and an adjacent annular recess are formed on the bottom surface of the above-mentioned non-rotating upper plate corresponding the above-mentioned floating ring and fixed ring, respectively. A plurality of hydraulic inlets are formed inside the annular hydraulic chamber for providing pressurized hydraulic fluid into the chamber. A matching floating ring having a slanted bottom surface and an annular protrusion fitting the vertical contour of the hydraulic chamber is inserted to the hydraulic chamber with enough fitting tolerance for the sliding movements in vertical direction. In addition, the slanted bottom surface of the floating ring is in direct contact with the bearing ball during the grinding process for supplying the grinding load to the bearing ball, whereby different grinding loads are exerted to the bearing ball by the floating ring through varying the hydraulic pressure inside the hydraulic chamber. The floating ring also serves rotating and damping functions for the bearing balls. A fixed ring having an annular anchoring block integrally formed on top fitting the vertical contour of the annular recess is inserted to the annular recess and anchored thereby at an adjacent position to the hydraulic chamber on the bottom surface of the above-mentioned non-rotating upper plate. The fixed ring and the floating ring are arranged at concentric positions adjacent to each other, thus a V-type grinding track is formed by the slanted bottom surface of the floating ring and an inner vertical surface of the fixed ring adjacent to the slanted bottom surface. Moreover, the fixed ring is typically switched for different grinding applications, which directly affects the grinding load and the moving speed and direction of each of the ceramic bearing balls.

The ball grinding machine according to the present invention also includes a driving shaft and a body frame, whereby the body frame comprises at least a base and a stand for supporting and anchoring the grinding mechanism thereto. Furthermore, the rotating lower plate comprises a top plate surface for installing a diamond grinding wheel and a back side coupled to the driving shaft for driving the lower plate into high speed rotation, which is powered by a speed-variable motor via a toothed transmission belt. The vertical dovetail slide is mounted to the stand of the above-mentioned body frame of the ball grinding machine, which supports the weight of the non-rotating upper plate and the components thereto and can slide freely in the vertical direction. A ball joint having a cylindrical end coupled to the vertical dovetail slide is installed at a top center location of the non-rotating upper plate, which supports the weight of the upper plate directly The ball joint enables the non-rotating upper plate to maintain a suspended position parallel to the rotating lower plate throughout the grinding process while countering the force of the grinding load. Finally, the ball grinding machine according to the present invention includes a conventional hydraulic device to supply hydraulic pressure to the above-mentioned hydraulic chamber of the non-rotating upper plate, wherein different hydraulic pressures can be supplied to change the grinding load to the bearing balls. The hydraulic device also supplies hydraulic pressure to a grinding fluid.

Accordingly, if the grinding load to the bearing balls in the V-type grinding track is appropriately adjusted, significantly improved uniformity of the mean diameter and finishing quality of worked bearing balls can be achieved. The ball grinding machine according to the present invention is characterized by the use of the concentric floating rings, which provides a quick adjustment of the grinding load while serving as a rotating and damping device at the same time. The floating ring design of the present invention contributes to better overall grinding quality and uniformity for bearing balls processed by batch loads.

Another advantage of using the ball grinding machine according to the present invention is that the floating and fixed rings and the diamond grinding wheel can be easily and inexpensively replaced after they are worn down, which contributes to a lower maintenance cost.

BRIEF DESCRIPTION OF THE DRAWINGS

Other objects, features, and advantages of the present invention will become apparent from the following detailed description of the preferred but non-limiting embodiment. The description is made with reference to the accompanying drawings in which.

DETAILED DESCRIPTION OF THE PREFERRED EMBODIMENT

The present invention relates to a ball grinding machine for machining and manufacturing precision bearing balls used in high speed bearings. More specifically, the invention relates to an improved ball grinding machine for machining and manufacturing ceramic bearing balls that incorporates one or more concentric floating rings, which achieves better ball sphericity, uniformity, and surface roughness by adjusting the grinding load exerted by three contacting surfaces of a grinding track to each of the ceramic bearing balls.

The ball grinding machine according to the present invention offers improved machining rate, production capability, flexibility, maintainability, and grinding precision. Moreover, the ball grinding machine of the present invention is characterized by the incorporation of one or more concentric grinding tracks and parallel upper and lower plates into the grinding mechanism, wherein the grinding load to the grinding track can be flexibly and suitably adjusted by varying the hydraulic pressure to the floating ring.

Figure 1:
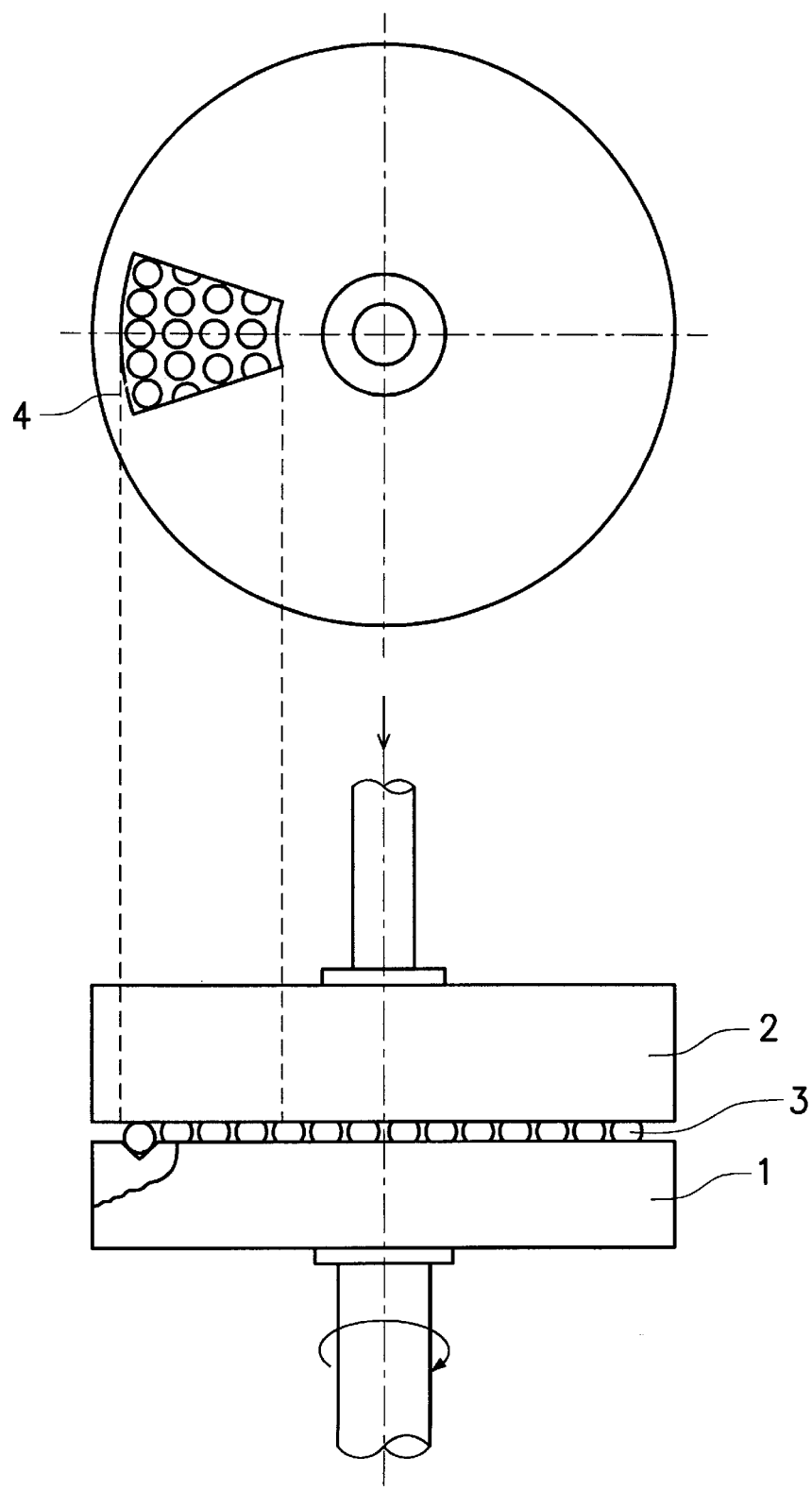
FIG. 1 shows the grinding mechanism of a prior ball grinding machine according to a grinding wheel method.
Figure 2:
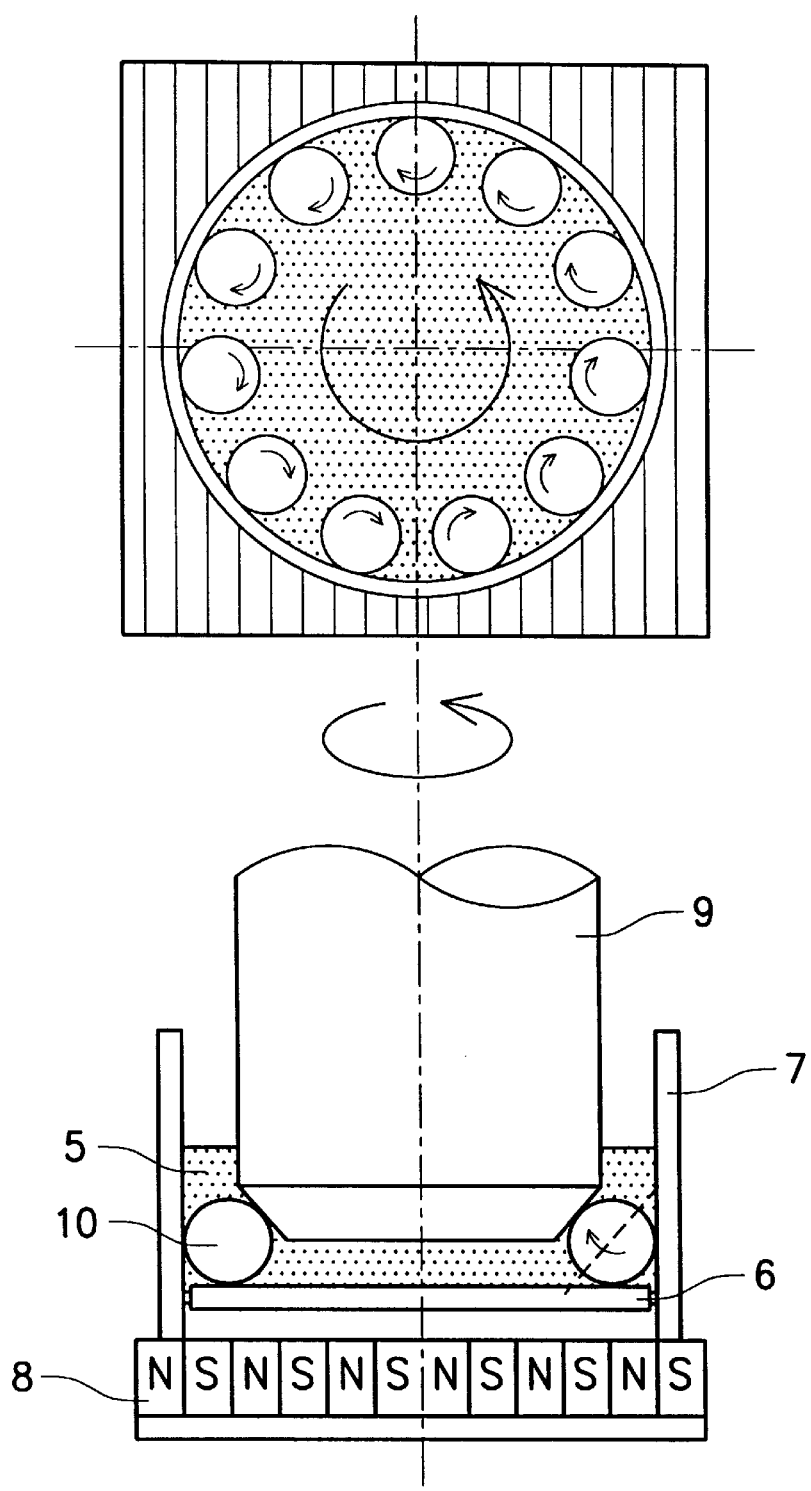
FIG. 2 shows the grinding mechanism of a prior ball grinding machine according to a magnetic fluid grinding method.
Figure 3:
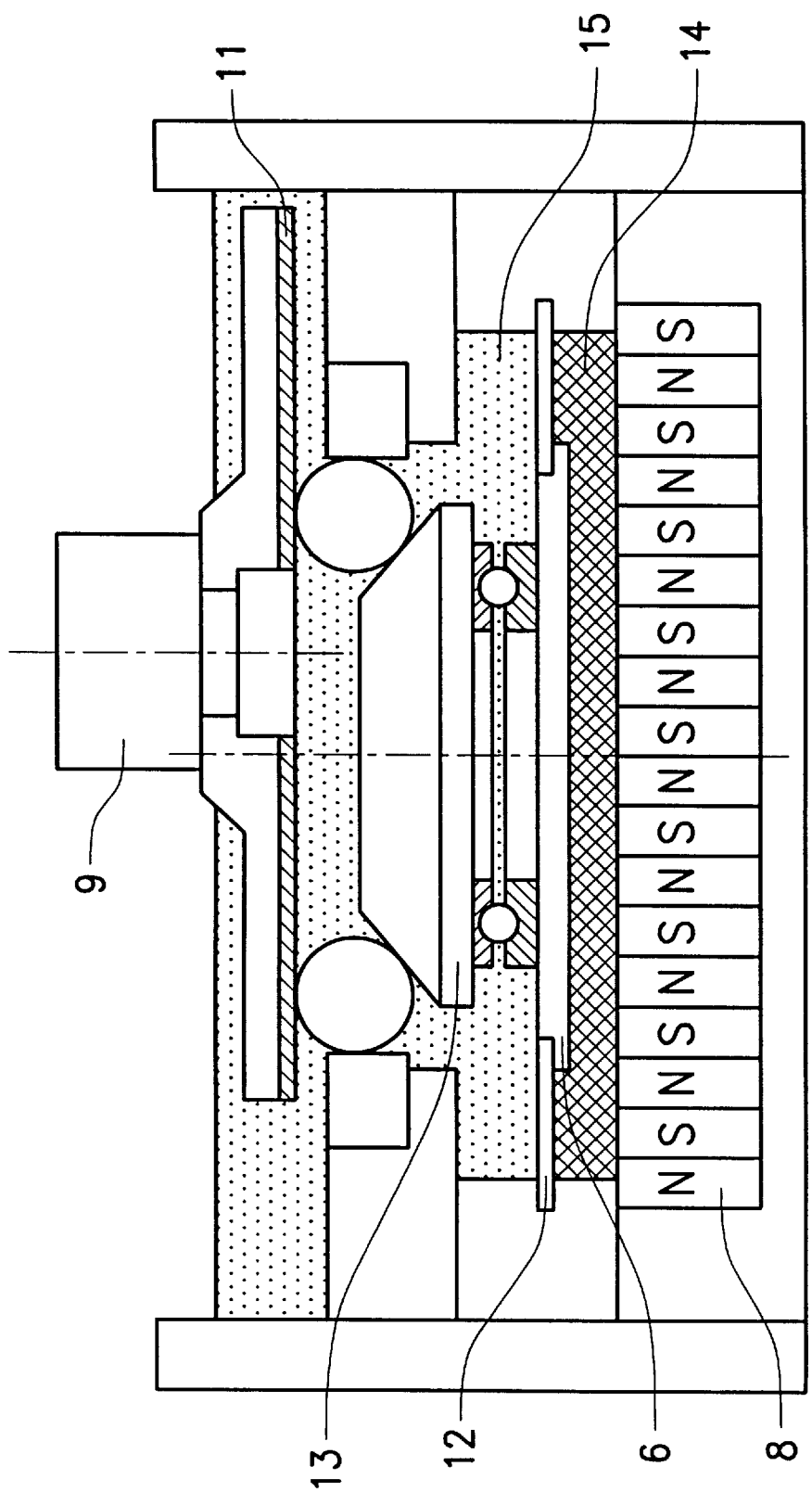
FIG. 3 shows the grinding mechanism of a prior ball grinding machine according to a magnetic fluid with grinding wheel method.
Figure 4:
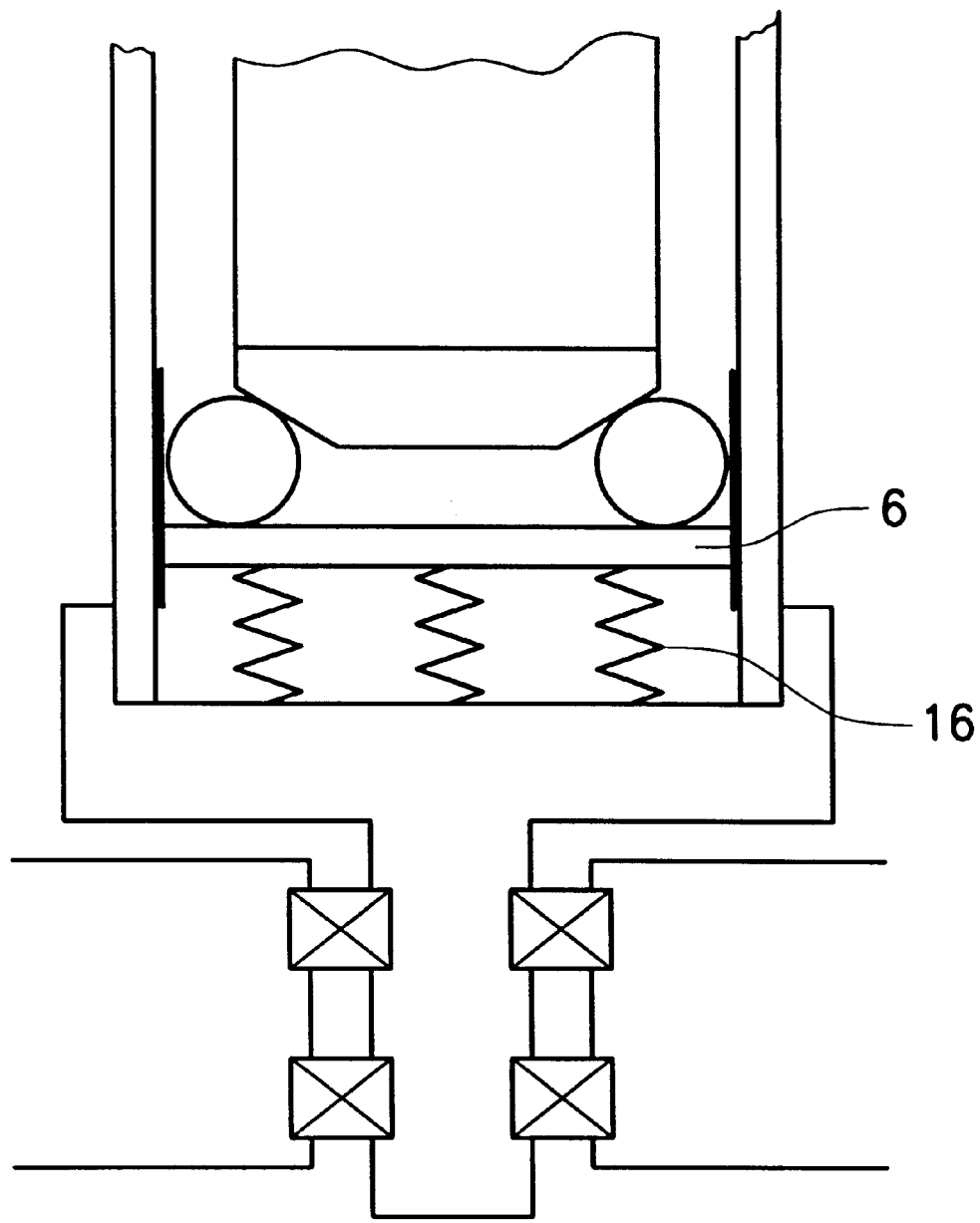
FIG. 4 shows the grinding mechanism of a prior ball grinding machine according to a non-magnetic fluid grinding method.
Figure 5:
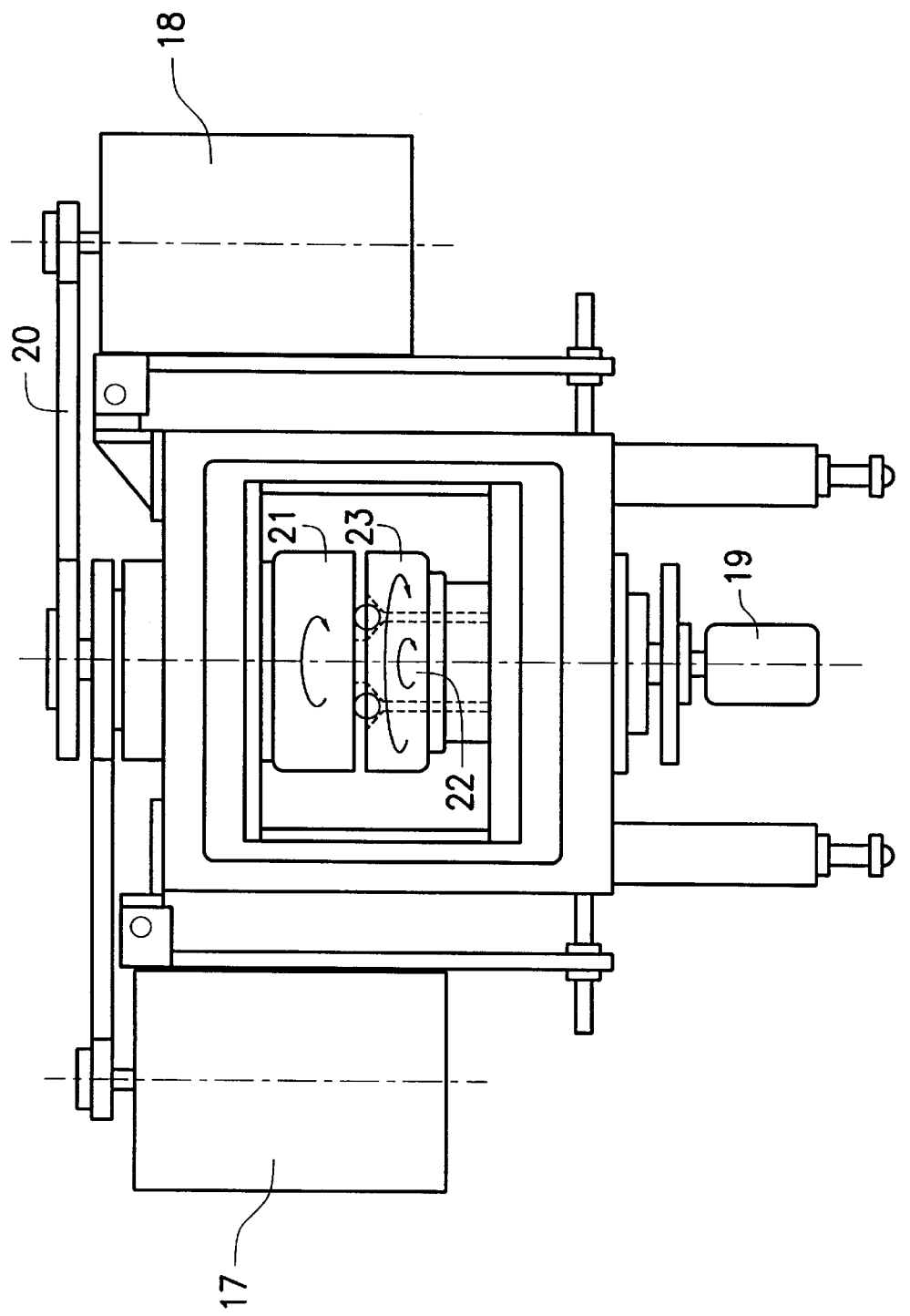
FIG. 5 shows the grinding mechanism of a prior ball grinding machine according to a controlled rotating shaft grinding method.
Figure 6:
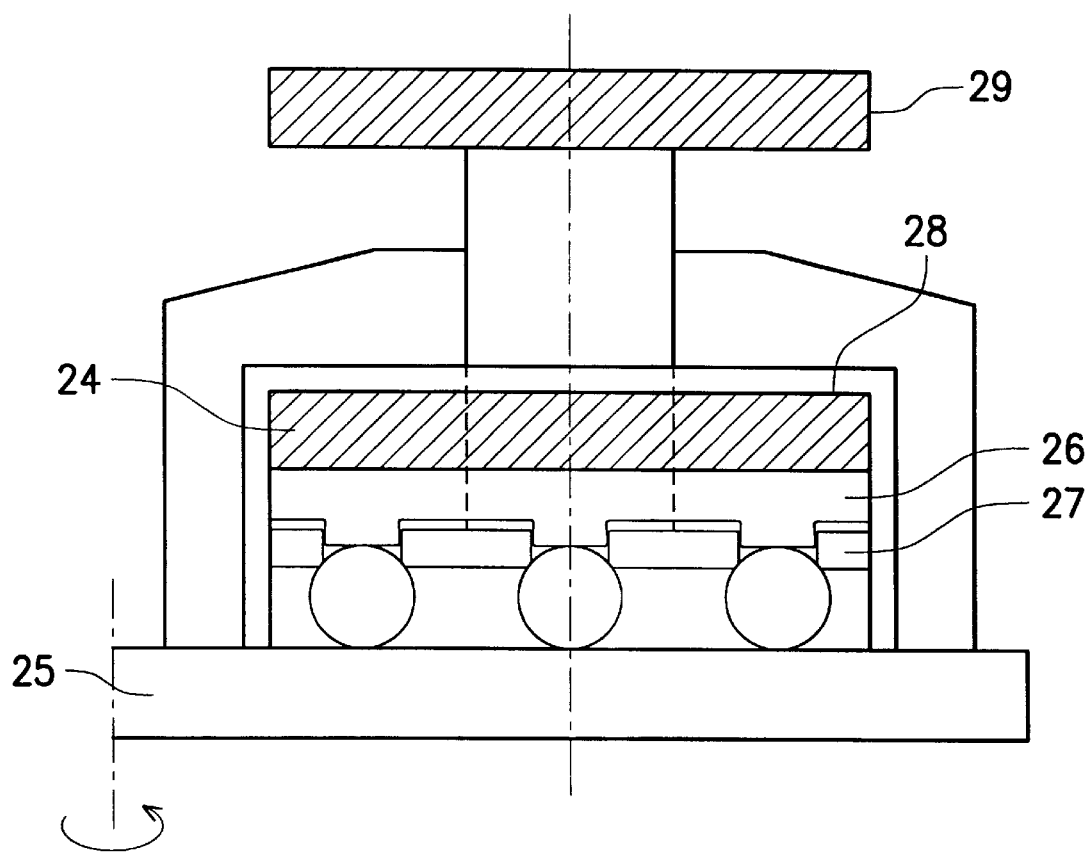
FIG. 6 shows the grinding mechanism of a prior ball lapping machine according to a combined rotating wheel grinding method.
Figure 7:
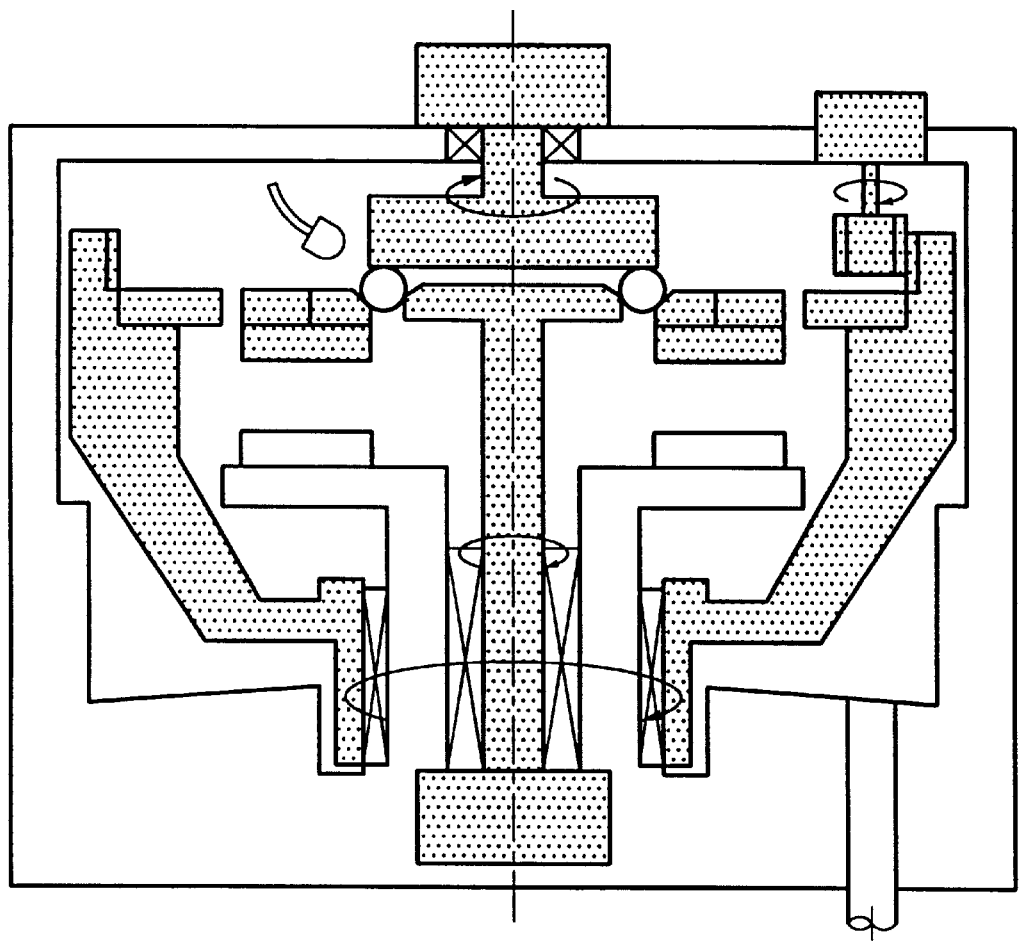
FIG. 7 shows the grinding mechanism of a prior ball grinding machine according to a magnetic levitation grinding method.
Figure 8:
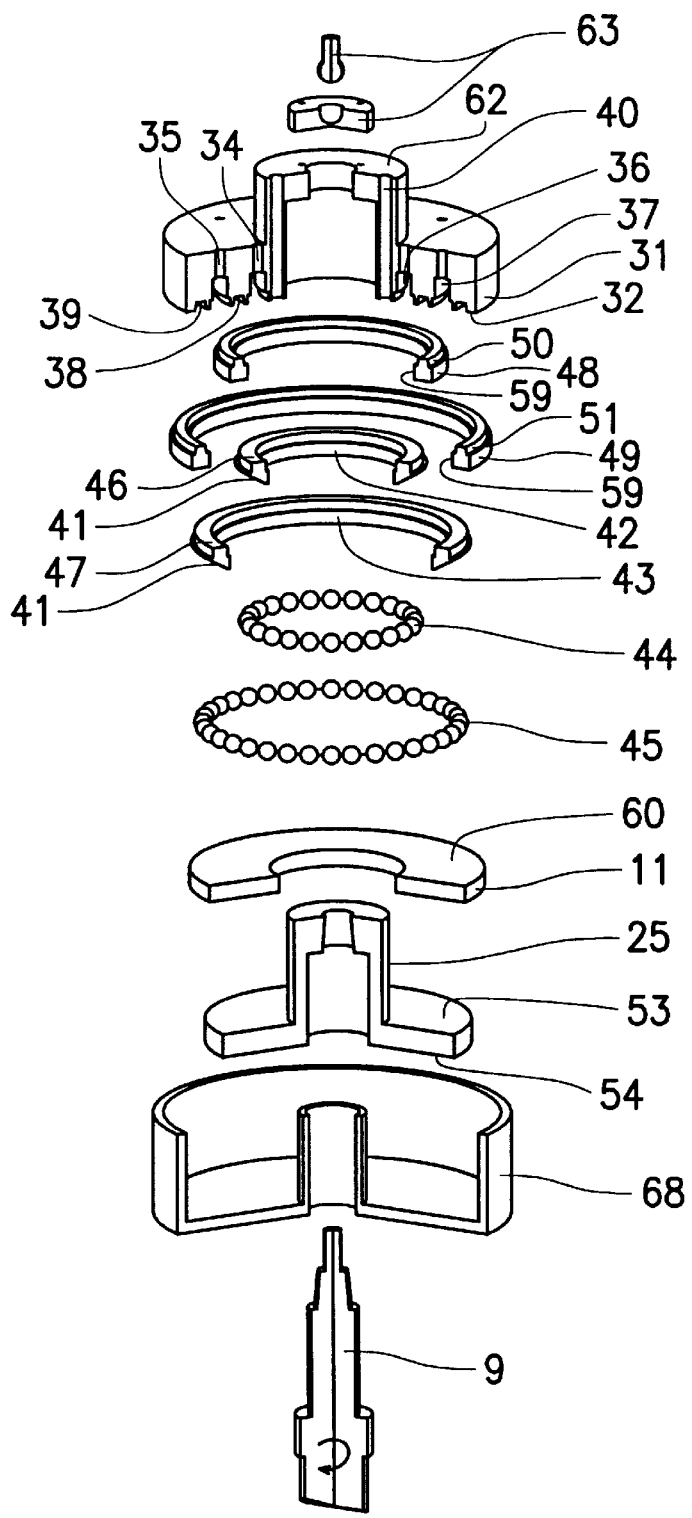
FIG. 8 shows a cross-sectional view of the ball grinding machine according to the present invention.
Figure 9:
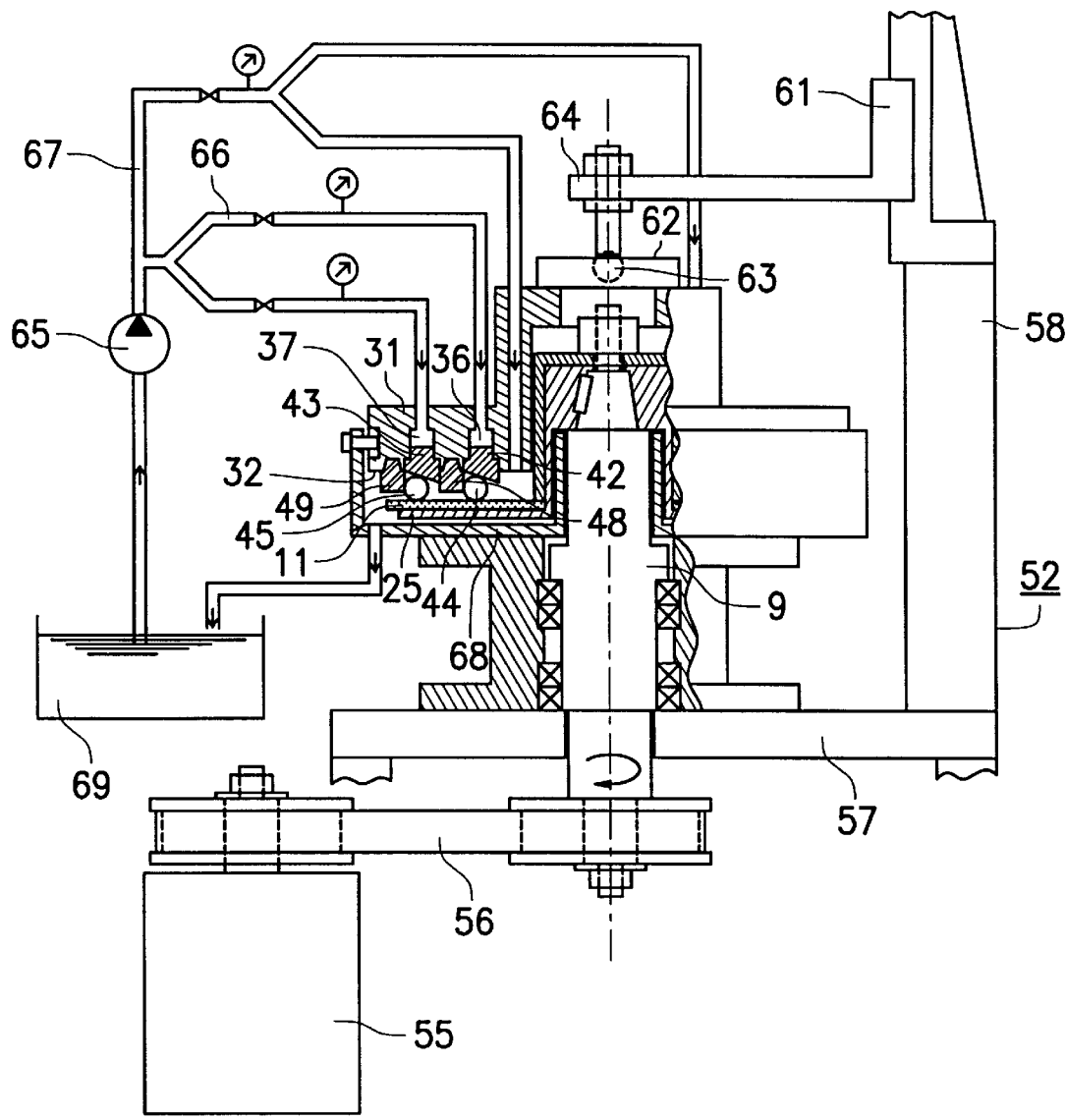
FIG. 9 shows an exploded perspective drawing of the ball grinding machine shown in FIG. 8.

As shown in FIG. 8 and 9, the ball grinding machine according to the present invention comprises a non-rotating upper plate 31 having a bottom surface 32, onto which at least a concentric hydraulic chamber and an adjacent annular recess are integrally formed, and wherein a plurality of hydraulic inlet openings are formed inside said hydraulic chamber. In particular, the ball grinding machine according to an embodiment of the present invention comprises concentrically an inner hydraulic chamber 36, an outer hydraulic chamber 37, an inner annular recess 38, and an outer annular recess 39, in which a plurality of hydraulic inlets are formed, such as the corresponding inner hydraulic inlet openings 34 and outer hydraulic inlet openings 35.

Furthermore, an opening towards the bottom of each of the inner hydraulic chamber 36 and the outer hydraulic chamber 37 is integrally formed, and an inner floating ring 42 and an outer floating ring 43, both having a slanted surface 41 towards the bottom, are inserted to the respective inner hydraulic chamber 36 and outer hydraulic chamber 37. In particular, a first annular protrusion 46 and a second annular protrusion 47 are each formed on top of the inner floating ring 42 and the outer floating ring 43, respectively, for a direct insertion to the opening of the respective hydraulic chamber with a fitting tolerance for sliding movements in the vertical direction. Hydraulic pressure inside each of the hydraulic chambers then exerts pressure to the respective floating ring such that a grinding load is generated and passed down via the floating rings to ceramic bearing balls in grinding tracks. Each of the above-mentioned floating rings also serves rotating and damping functions, which also makes a tighter surface contact between the ceramic bearing balls and the diamond grinding wheel 11.

In addition, an inner fixed ring 48 and an outer fixed ring 49 are each installed to the corresponding inner annular recess 38 and outer annular recess 39 on the bottom surface 32 of the non-rotating upper plate 31 such that each of the fixed rings is positioned immediately adjacent to a respective floating ring. A first annular anchoring block and a second annular anchoring block each having a vertical contour of the respective annular recess are formed to top of the inner fixed ring 48 and the outer fixed ring 49, respectively, for insertion and anchoring to the inner and outer annular recesses. According to an embodiment of the present invention, the inner and outer fixed rings 48 and 49 can be switched freely depending on the machining requirements. In addition, all of the above-mentioned components such as the floating and fixed rings, annular recesses, hydraulic chambers, etc. are positioned at concentric locations.

The ball grinding machine according to the present invention further comprises a rotating lower plate 25, a body frame 52, and a driving shaft 9 for providing a rotational drive. A diamond grinding wheel 11 is installed on a top surface 53 of the rotating lower plate 25 as a grinding tool with the back side 54 of the rotating lower plate 25 coupled to the driving shaft 9 in order to drive the lower plate into high speed rotation, which is powered by a speed-variable motor 55 via a toothed transmission belt 56. The body frame 52 comprises at least a base 57 and a vertical stand 58 for supporting and anchoring the grinding mechanism which includes at least the upper and lower plates 31 and 25, the driving shaft 9, and all the components in between. Referring to FIG. 9, the present invention is characterized by three contacting surfaces including the slanted surface 41 of the floating ring, inner vertical surface 59 of the fixed ring, and grinding surface 60 of the diamond grinding wheel 11, and by a V-type grinding track formed by the slanted surface 41 and the inner vertical surface 59

Referring to FIG. 9 again, the ball grinding machine according to the present invention is further characterized by a vertical dovetail slide 61, which is slidably installed to a stand 58 of the above-mentioned body frame 52 for adjustments in the vertical direction, and a ball joint 63 installed on a top center portion 62 of the non-rotating upper plate 31. A cylindrical end 64 of the ball joint 63 is coupled and anchored thereby to an extended terminal portion 64 of the vertical dovetail slide 61. The vertical dovetail slide 61 and the ball joint 63 coupled thereto together support the weight of the non-rotating upper plate 31, and the ball joint 63 enables the non-rotating upper plate 31 to maintain a suspended position parallel to the rotating lower plate 25 throughout the grinding process while countering the force of the grinding load.

Finally, the ball grinding machine according to the present invention includes a conventional hydraulic device 65 to supply hydraulic pressure to the above-mentioned hydraulic chambers of the non-rotating upper plate 31 via a hydraulic supplying channel 66, wherein different hydraulic pressures can be supplied to change the grinding load to the bearing balls. The hydraulic device also supplies hydraulic pressure to transport the grinding fluid in a grinding fluid channel 67. As shown in FIG. 8, the ball grinding machine of the present invention also requires a conventional outer housing 68 for confining the grinding mechanism inside an enclosed space and for preventing the grinding fluid from spilling outside the enclosed space. The grinding fluid circulates via the grinding fluid channel 67 and a plurality of grinding fluid supplying inlets 40 within the non-rotating upper plate 31 to reach the grinding surface 60 of the diamond grinding wheel 11, then a grinding fluid tank 69 collects, filters, and stores the grinding fluid in a recycling fashion.

Although the ball grinding machine according to the above-mentioned embodiment comprises only two concentric V-type grinding tracks, it should be obvious to the ordinary person skilled in the art that the present invention is not limited to such arrangement One concentric V-type grinding track or three or more concentric V-type grinding tracks could also be used.

According to another embodiment of the present inventions the ball grinding machine of the present invention can be easily applied to the grinding of conventional steel bearing balls by simply replacing the diamond grind wheel 11 with a conventional emery grinding wheel (not shown). The ball grinding machine of the present invention can be easily optimized for the best performance whether it is for a rough grinding, a fine grinding, or lapping process. In addition, significantly improved uniformity of the mean diameter and finishing quality of worked bearing balls can be achieved by the use of the concentric floating rings.

Another advantage of using the ball grinding machine according to the present invention is that the floating and fixed rings and the diamond grinding wheel can be easily and inexpensively replaced after they are worn down, which also contributes to a lower maintenance cost.

The following is a list of operational conditions and settings by which the present invention is tested for the optimum performance:

a. type of diamond grinding wheel: a layer of abrasive diamond grains is electroplated on a steel circular plate with the mesh number (or average grain size) being SD#270(60 $\mu$m), SD#600(28 $\mu$m), and SD#2000(7.9 $\mu$m);

b. floating and fixed ring material: aluminum alloy;

c. inclination angle for the slanted surface of the floating ring: 30°;

d. grinding load: on single bearing ball: from 0.4 N (about 40 g) to 0.8 N (about 80 g);

e. rotational speed of the diamond grinding wheel: from 100 rpm to 1800 rpm (with the maximum being 7000 rpm);

f. material type for the precision ceramic bearing balls: $Al_2O_3$ with a final mean diameter of 10.10 mm and a ball sphericity of about 124 $\mu$m;

g. diameter across the grinding tracks: inner grinding track: 104 mm, outer grinding track: 156 mm;

h. type of grinding fluid: kerosene.

Figure 10:
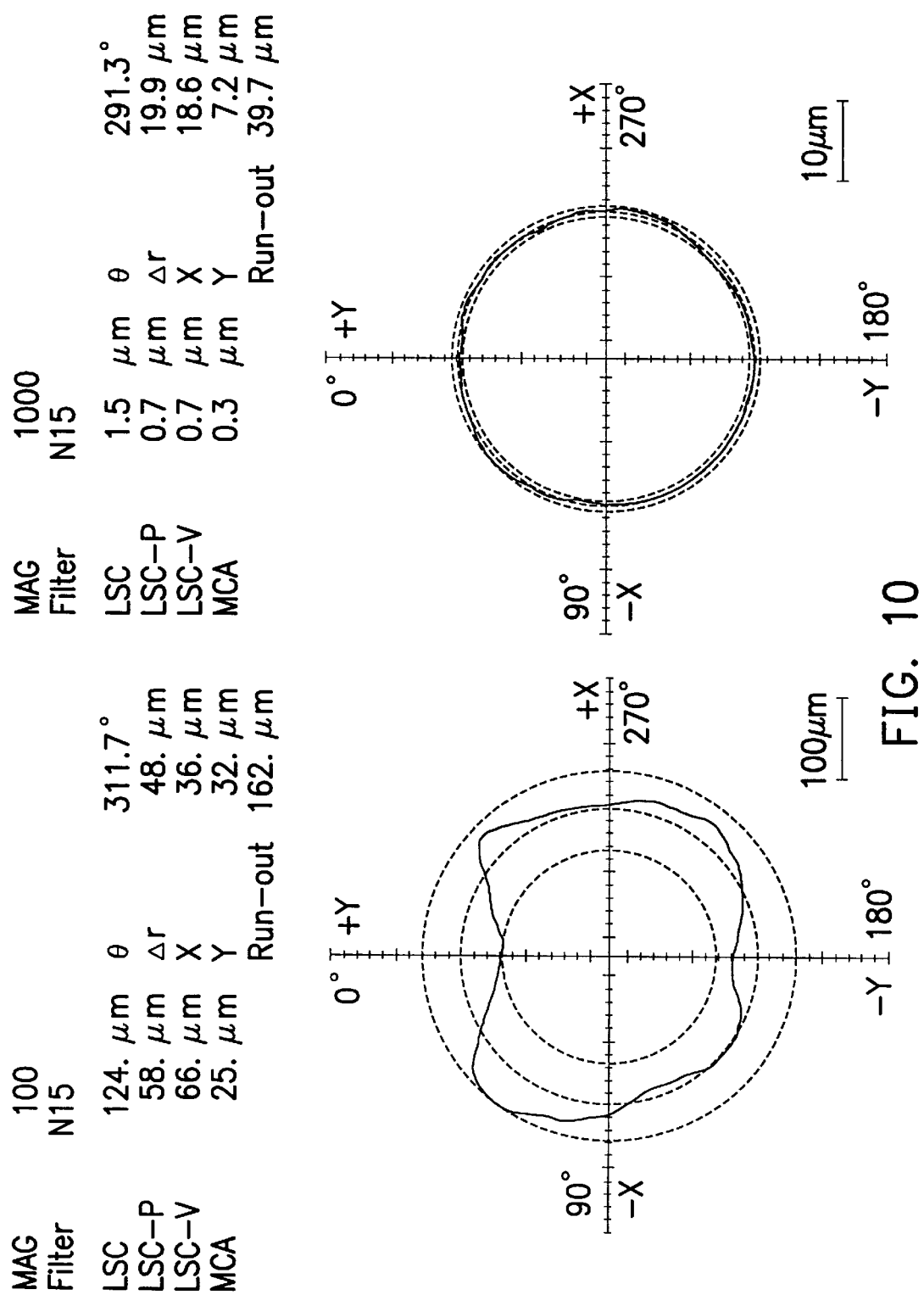
FIG. 10 shows the measured contours of a ceramic bearing ball before being ground by the ball grinding machine of the present invention (left graph) and after (right graph).

As shown in FIG. 10, under the operational conditions of 30° inclination angle, 0.4 N grinding load on single bearing ball, SD#2000 diamond grinding wheel, and 450 rpm rotational speed, the contour of a ceramic bearing ball is measured by a sphericity gauge, such as a Kosaka Roncorder EC-102A, before and after grinding by a ball grinding machine of the present invention. As clearly indicated by FIG. 10, The sphericity (or LSC) changes from 124 μm before grinding to 1.5 μm after grinding.

Figure 11:
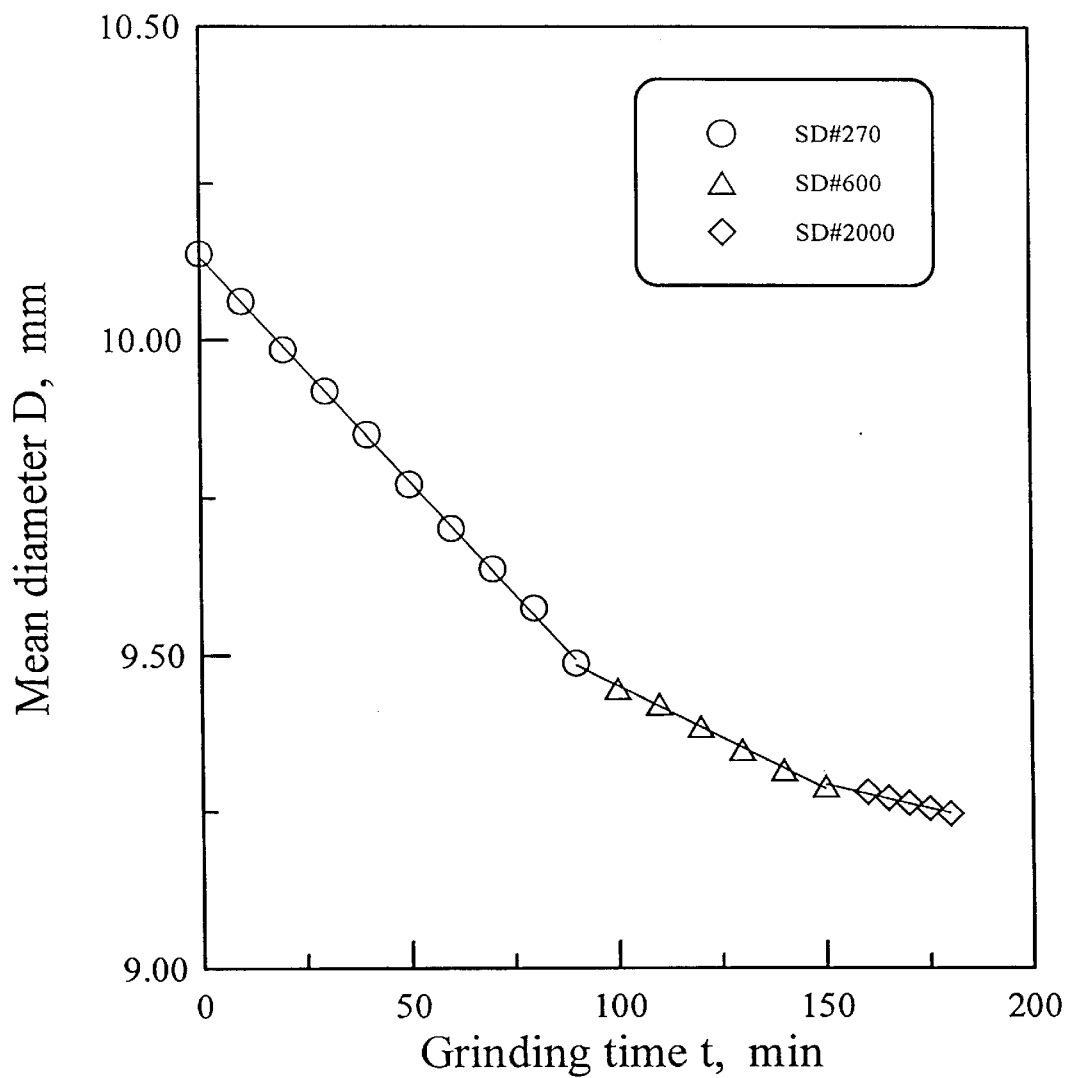
FIG. 11 is a graph displaying the relationship between mean diameter and grinding time for ceramic bearing balls machined by the ball grinding machine of the present invention.
Figure 12:
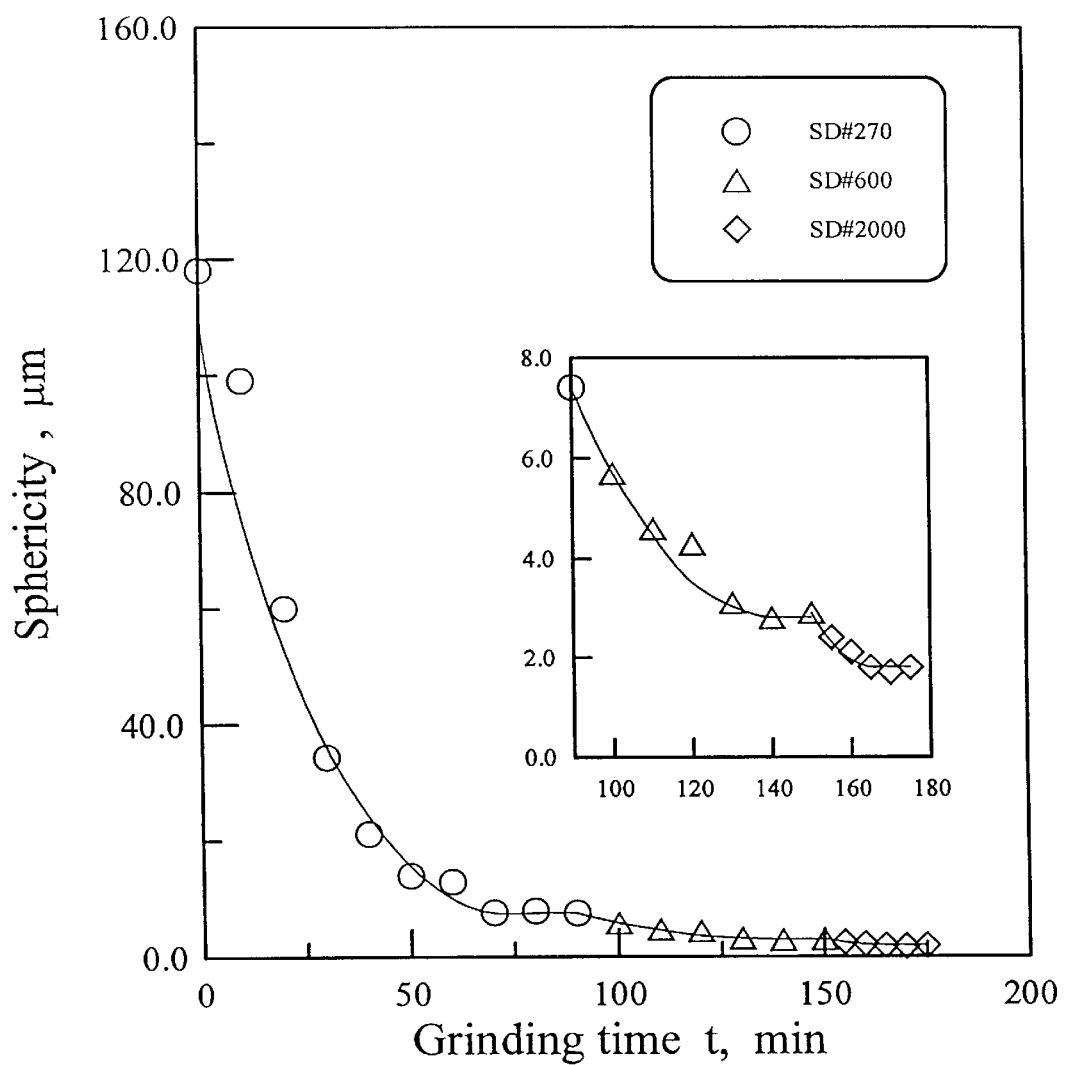
FIG. 12 is a graph displaying the relationship between sphericity and grinding time for ceramic bearing balls machined by a ball grinding machine of the present invention.

FIG. 11 and 12 show the mean diameter vs. grinding time and sphericity vs. grinding time relationships of a ceramic bearing ball ground by the present invention under the conditions and settings of 30° inclination angle, 0.4 N grinding load, 1200 rpm rotational speed, and a selection of SD#270, SD#600, and SD#2000 diamond grinding wheels. Also as indicated by FIG. 11 and 12, the ball diameter decreasing rate (or machining rate) and sphericity are 7 μm/min and 7.4 μm, respectively, when a SD#270 (grain size 60 pm) diamond grinding wheel is used, and when a SD#2000 (grain size 7.9 μm) is used, a 1.6 μm/min ball diameter decreasing rate and 1.9 μm sphericity are achieved.

Figure 13:
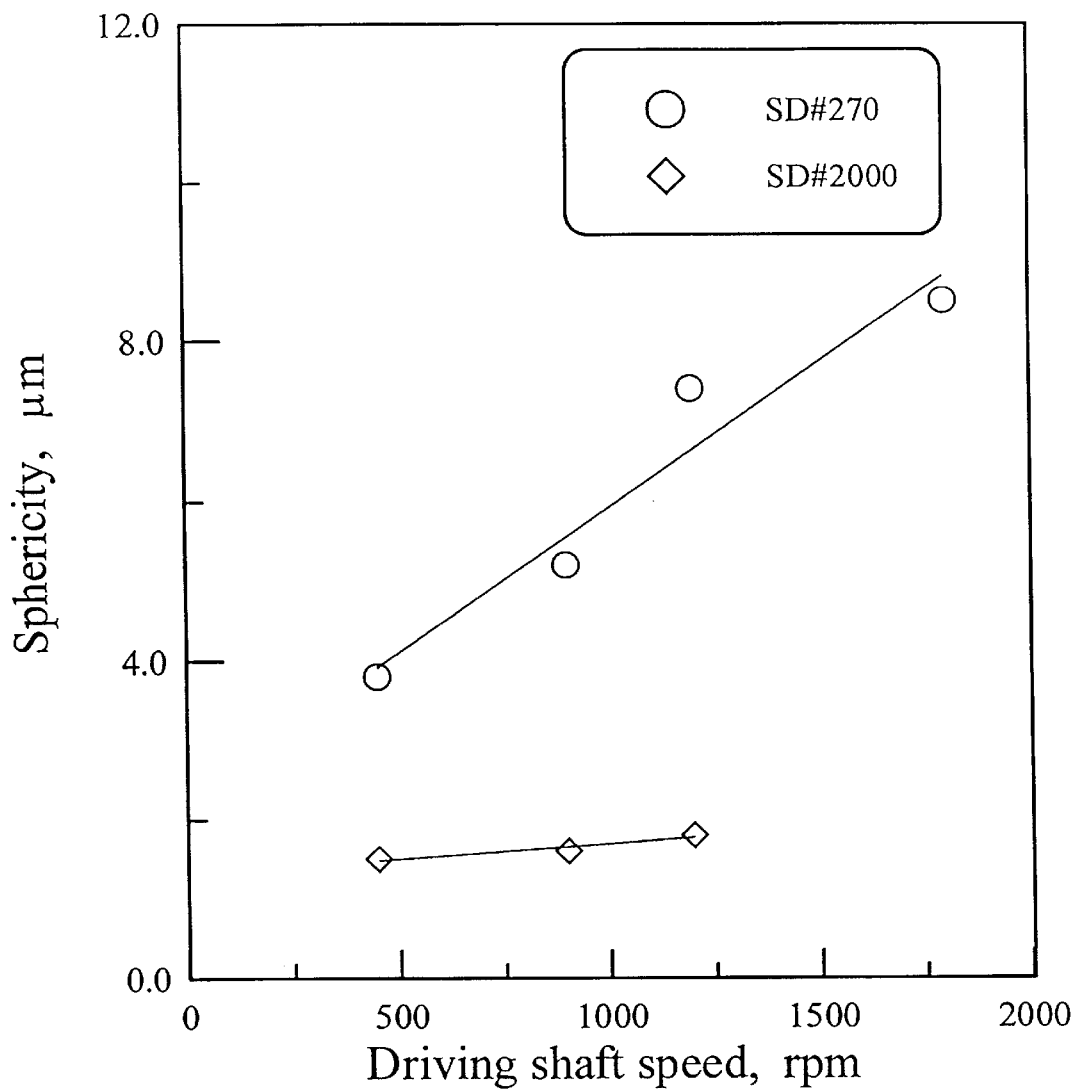
FIG. 13 is a graph displaying the relationship between sphericity and driving shaft speed for ceramic bearing balls machined by the ball grinding machine of the present invention.

Furthermore, FIG. 13 shows the relationship between sphericity and rotational speed of the diamond grinding wheel under the conditions of 30° inclination angle, 0.4 N grinding load, and diamond grinding wheels of two different grain sizes. When a SD#2000 diamond grinding wheel is used and the rotational speed reduced from 1200 rpm to 450 rpm, the sphericity of the ceramic bearing ball decreases from 9 μm to 1.5 μm accordingly. Based on this test result, it should be reasonable to expect higher measured sphericity if a diamond grind wheel of finer grain size is used under optimum conditions and settings.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A ball grinding machine for grinding bearing balls, comprising:
    a non-rotating upper plate having a top side and a bottom surface, wherein at least a hydraulic chamber and an adjacent annular recess are concentrically formed on the bottom surface and a plurality of hydraulic inlet openings are integrally formed the inside of the hydraulic chamber;
    at least a floating ring having an annular protrusion slidably installed and matched to the hydraulic chamber and a slanted surface for exerting a grinding load to bearing balls;
    at least a fixed ring having an annular anchoring block and an inner surface facing towards an adjacent floating ring, wherein the annular anchoring block is inserted to the corresponding annular recess for anchoring to the non-rotating upper plate;
    a rotating lower plate having a top surface and a back side; and
    a grinding surface positioned over the top surface of the rotating lower plate.

2. The bail grinding machine as claimed in claim 1, wherein the grinding surface is provided by a diamond grinding wheel installed on the top surface of the rotating lower plate for grinding ceramic bearing balls.

3. The ball grinding machine as claimed in claim 1, wherein the grinding surface is provided by an emery grinding wheel installed on the top surface of the rotating lower plate for grinding steel bearing balls.

4. The ball grinding machine as claimed in claim 1, wherein a V-type grinding track for grinding the bearing balls is formed by the slanted surface of the floating ring and the inner surface of an adjacent fixed ring.

5. The ball grinding machine as claimed in claim 4, wherein the ball grinding machine further comprises a body frame having a base and a vertical stand for supporting and anchoring each member and component of the machine.

6. The ball grinding machine as claimed in claim 5, wherein the ball grinding machine further comprises a driving shaft coupled to the back side of the rotating lower plate for wide-range high speed rotation.

7. The ball grinding machine as claimed in claim 6, wherein the ball grinding machine further comprises a vertical dovetail slide installed to the vertical stand of the body frame and having a tail portion for coupling to the non-rotating upper plate and supporting the weight thereto.

8. The ball grinding machine as claimed in claim 7, wherein the ball grinding machine further comprises a ball joint installed to the top side of the non-rotating upper plate and anchoring the non-rotating upper plate to the tail portion of the vertical dovetail slide thereby, which supports the grinding road and maintains the upper and lower plates in suspended positions parallel to each other during grinding.

9. The ball grinding machine as claimed in claim 4, wherein the ball grinding machine further comprises a hydraulic device for supplying and controlling the grinding load to the above-mentioned V-type grinding track via a plurality of hydraulic inlet openings integrally formed to the inside of the hydraulic chamber; and wherein the hydraulic device also supplies hydraulic pressure for transporting a grinding fluid to the V-type grinding track.

10. The ball grinding machine as claimed in claim 9, wherein the ball grinding machine frame further comprises an outer housing for confining the bearing balls, floating ring, fixed ring, and grinding wheel inside an enclosed space filled with the grinding fluid to prevent spilling from occurring.

11. The ball grinding machine as claimed in claim 10, wherein ball grinding machine further comprises a grinding fluid tank for collecting, filtering, and storing the grinding fluid in a recycling fashion.

12. The ball grinding machine as claimed in claim 4, wherein the number of V-type grinding track formed in between the upper and lower plates is two or more.

13. The ball grinding machine as claimed in claim 4, wherein the slanted surface of the floating ring, the inner surface of an adjacent fixed ring, and the grinding surface form three contacting surfaces with the bearing balls in the V-type grinding track.

* * * * *